Figures 1, 2:
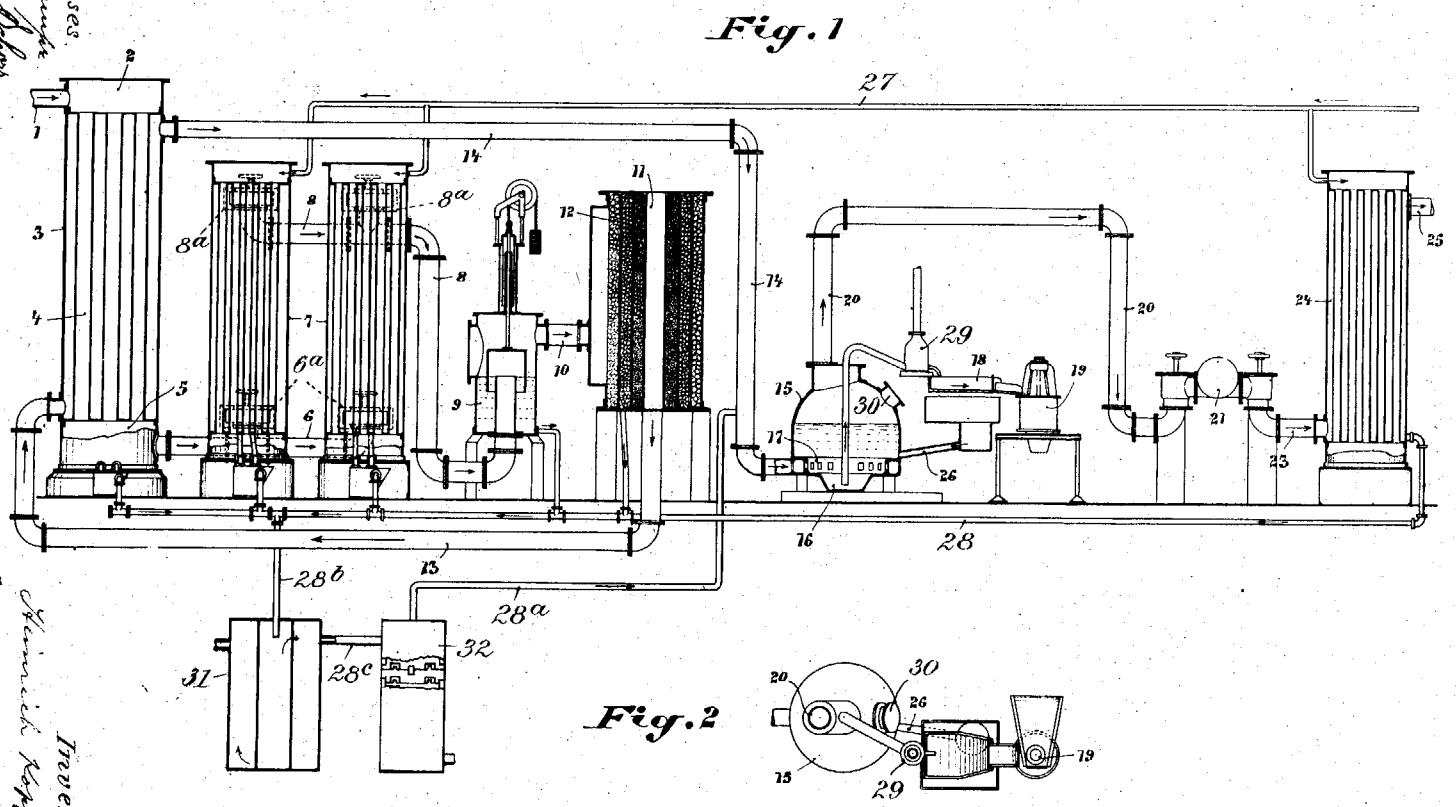

H. KOPPERS.

PROCESS OF OBTAINING AMMONIA AND TAR.

APPLICATION FILED OCT. 14, 1908.

Reissued June 8, 1909.

12,971.

Witnesses.
A. E. Zimpfer
Edward Schor.

Inventor:
Heinrich Koppers
by Frank K. Brown Att'y.

UNITED STATES PATENT OFFICE.

HEINRICH KOPPERS, OF ESSEN-ON-THE-RUHR, GERMANY.

PROCESS OF OBTAINING AMMONIA AND TAR.

No. 12,971. Specification of Reissued Letters Patent. Reissued June 8, 1909.

Original No. 862,976, dated August 13, 1907, Serial No. 288,488. Application for reissue filed October 14, 1908. Serial No. 457,763.

*To all whom it may concern:*

Be it known that I, HEINRICH KOPPERS, a subject of the German Emperor, residing at Essen-on-the-Ruhr, Germany, have invented an Improved Process of Obtaining Ammonia and Tar, of which the following is a specification.

This invention relates to a process for separating the by-products from gases of dry distillation or gasification of fuel, by which process the tar and ammonia are obtained in a more simple, pure and economical manner than heretofore. By my invention the separation of each product takes place at the temperature best adapted therefor, while the separation of the tar is effected before the ammonia is obtained.

In the accompanying drawing: Figure 1 is a sectional elevation of a plant for carrying my invention into effect, and Fig. 2 a plan of the saturating vessel and adjoining parts.

An oven, such as a coke oven, gas retort or other gas producer, is connected by tube 1, with the head 2 of a heat exchanger 3, said head communicating with the base 5 by a cluster of pipes 4. A tube 6, controlled by valves 6[a], leads from exchanger 3, to a pair of parallel coolers 7, the temperature of which may be lowered in known manner by water or other cooling liquid supplied by a pipe 27. From the top of coolers 7, a pipe 8, which is controlled by valves 8[a], leads to a suitable tar separator 9 which is, by pipe 10, connected to a filter 11. This filter comprises a vertical cylinder with a number of inner concentric perforated annular walls 12 that form compartments for the reception of the filtering material. The latter is composed of layers of coke or similar matter, which gradually increases in fineness from the exterior toward the interior of the filter. The tar and water here separated descend to the bottom of the filter, from whence they may be withdrawn through a pipe 28 which also takes up the condensate formed in heat exchanger 3, and coolers 7 and 24, hereinafter referred to. A pipe 13 leads from the filter back to that chamber of exchanger 3, which is traversed by pipes 4 between head 2 and base 5. From the top of this chamber a pipe 14 leads to a saturation vessel 15 with which it communicates through an annular finely apertured channel 17 arranged near the bottom of vessel 15. This vessel, which is preferably closed, has a lead lining and is partly filled with dilute acid. Pipe 28 communicates through branch 28[b] with a tar separator 31 which is, in turn, through pipe 28[c], connected to a distillation apparatus 32. The latter communicates through pipe 28[a] with pipe 14, and consequently with vessel 15. A cavity 16 in the bottom of vessel 15 serves for the reception of the salt which is separated in the form of fine crystals. An injector or similar device 29 raises the salty precipitates from vessel 15 into a trough 18, from which they enter a centrifugal drier 19. The liquid in trough 18 passes through tube 26 back into saturation vessel 15. Any tar that collects at the bottom of said vessel may be removed by a suitable ladle which may be introduced into the vessel through an opening 30. The acid necessary for replenishing the bath may, if desired, also be introduced through this opening. From the cover of vessel 15 a tube 20 leads to a gas suction device 21 which, by pipe 23, is connected to a cooler 24 provided with a gas exit pipe 25.

The operation is as follows: The raw gas from the oven passes through pipe 1, into exchanger 3, where it flows through pipe-cluster 4, in which it is cooled by the cold gas flowing from tube 13 around said cluster. A further intensive cooling of the gas to any point desired is next effected in coolers 7, by a suitable cooling medium. The reduction of temperature should be such that the subsequent separation of the tar will take place under the most favorable conditions. This separation is effected in known manner within the tar separator 9 and the tar filter 11, in which, owing to the treatment described, the tar is obtained almost in full quantity and in a pure state. As the tar does not come into contact with the acid, it is acid free and not decomposed. The gases leaving tar filter 11 will, owing to their low temperature, carry but a small percentage of water. As these gases are conveyed by pipe 13 to exchanger 3, where they surround the pipe cluster 4, which is charged with the hot gases, they will become re-heated to a temperature which may be raised to a suitable degree. This temperature is in each case so selected as to be most favorable for the direct production of ammonium sulfate. As the gases now contain relatively less water than can be carried at this temperature, the vapor suspended in the mixture is superheated, so that its temperature may be considerably lowered before a condensation of water will take place and that vaporization may also take place even in the saturation vessel to which the gas is conducted through pipe 14. Vessel 15 is filled with a bath of sulfuric acid, or an acid salt solution. This bath has a concentration always at an appropriate temperature for the of about 30–33° Baumé, and is maintained purpose of preventing any condensation. The necessary degree of concentration is maintained by adding sulfuric acid as required.

As the gas passing into the bath through the perforated ring 17 is superheated and thus possesses the faculty of taking up water, a vaporization of the water produced in the acid bath can take place. While the gas passes through the bath, it gives up its ammonia to the free acid and then flows from vessel 15 through tube 20 into the gas suction device 21 that forces it into cooler 24, where any water contained in the gas is condensed.

In order that any organic substances which have not been separated in the tar separator 9 and filter 11, will not be attacked in the acid bath, a weak acid bath, with as constant a strength as possible, is used. The constancy of the latter is maintained by continuously adding fresh acid and removing the salt. If, in this manner, the quantity of the added acid corresponds exactly to the quantity of acid which combines with the ammonia to form the salt, the desired constancy of the acidity is obtained. As this bath can only acquire a certain degree of concentration, it will not attack the tar, and especially not the readily boiling components thereof. The rest of the organic components will therefore pass unchanged through the bath, to be finally separated together with the water and to be added to the previously obtained bulk of the tar. Any thickened tar that may reach the saturation bath, may be removed therefrom by any suitable mechanical appliance, such as a pump.

The gas leaving the coke oven, gas retort or other gas producer, contains the ammonia a part of which is combined with acid. This part of the ammonia is separated before the passage through the saturation vessel, in the form of a weak saline solution, together with the tar and water and may be treated in any suitable manner.

If the process is to be carried out that practically the entire quantity of water contained in the raw gas is to be finally precipitated in cooler 24, where it appears as pure water, the operation is as follows:

During the cooling of the gases, care is taken that the minimum temperature reached corresponds, substantially, to the dew point of the gases. The dew point of retort gas is about 72° centigrade, and that of coke oven gas is about 85° centigrade, at a barometer stand of 760 millimeters. This difference arises from the higher percentage of water in the coke oven gas, as coking coal, owing to the washing process, generally contains a greater percentage of water than gas coal. The tar will thus be condensed in the form of a mist floating in the gas and is obtained in this condition in the tar separator. If the gases are now superheated, as before, and conducted through the acid bath, they will carry their full charge of water, or at least the greater part thereof, through the entire operation, so that the water is condensed mainly in the terminal cooler 24, in the form of pure water. This operation possesses, however, a certain element of uncertainty, as it is difficult to retain a fixed temperature, and furthermore, as the temperature required in the saturation vessel must be higher than that most favorable for the interaction between the ammonia and the acid,

I claim:

1. Process of obtaining ammonia and tar from the gases of the dry distillation or gasification of fuels, which consists in cooling said gases so as to condense tar and water, passing the gases through a tar separator, withdrawing the tar, superheating the gases freed from tar, and conducting said gases to an acid saturation bath.

2. Process of obtaining ammonia and tar from the gases of the dry distillation or gasification of fuels, which consists in cooling said gases so as to condense tar and water, passing the gases through a tar separator, withdrawing the tar, superheating the gases freed from tar, conducting said gases to an acid saturation bath which is maintained at a uniform concentration by means of a constant supply of acid and a constant withdrawal of the deposited salt, conducting the withdrawn salt to a drier, and returning the resulting liquor to the saturation bath.

3. Process of obtaining ammonia and tar from the gases of the dry distillation or gasification of fuels, which consists in cooling said gases to approximately the dew point of water saturation, so as to condense the tar in the form of a mist floating in the gases, passing the gases through a tar separator, withdrawing the tar, superheating the gases freed from tar, conducting said gases to an acid saturation bath which is maintained at a uniform concentration by means of a constant supply of acid and a constant withdrawal of the deposited salt, conducting the withdrawn salt to a drier, and returning the resulting liquor to the saturation bath.

HEINRICH KOPPERS.

Witnesses:
LOUIS WILPUTTE,
FRANK V. BRIESEN.